United States Patent [19]

Elliot

[11] Patent Number: 5,147,428
[45] Date of Patent: Sep. 15, 1992

[54] APPARATUS FOR FILTERING AN AIR STREAM, IN PARTICULAR FOR A MOTOR VEHICLE

[75] Inventor: Gilles Elliot, Courcouronnes, France

[73] Assignee: Valeo Thermique Habitacle, Saint Denis, France

[21] Appl. No.: 732,175

[22] Filed: Jul. 18, 1991

[30] Foreign Application Priority Data

Jul. 19, 1990 [FR] France .................. 90 09245

[51] Int. Cl.⁵ .............................................. B01D 46/00
[52] U.S. Cl. ......................................... 55/309; 55/422
[58] Field of Search ................................. 55/309–314, 55/422

[56] References Cited

FOREIGN PATENT DOCUMENTS

| 0183937 | 8/1988 | European Pat. Off. . |
| 3330950 | 3/1985 | Fed. Rep. of Germany . |
| 3706219 | 9/1988 | Fed. Rep. of Germany . |
| 3737010 | 5/1989 | Fed. Rep. of Germany . |

Primary Examiner—Bernard Nozick
Attorney, Agent, or Firm—Longacre & White

[57] ABSTRACT

An air filter apparatus, in particular for a heating and/or air conditioning installation for a motor vehicle, is of the kind comprising a housing through which an air stream can pass, with at least one filter member pivotally mounted within the housing for movement between a working position and retracted position.

The filter member comprises a first end which is pivotally mounted about a first axis extending at right angles to the direction of flow of the air stream, and a second end disposed around a second pivot axis which is parallel to the first pivot axis. In the retracted position, a valve flap member overlies the filter member so as to prevent impurities carried by the filter member from becoming drawn into the air stream.

10 Claims, 2 Drawing Sheets

APPARATUS FOR FILTERING AN AIR STREAM, IN PARTICULAR FOR A MOTOR VEHICLE

FIELD OF THE INVENTION

This invention relates to apparatus for filtering an air stream, especially (though not exclusively) for a heating and/or air conditioning installation for a motor vehicle.

BACKGROUND OF THE INVENTION

It has previously been proposed to provide a heating and/or air conditioning installation for a motor vehicle with a filter apparatus for filtering the air which is passed into the cabin of the vehicle, so as to remove contaminants, and in particular dust and smells. The specification of published European patent application No. 0 183 937 describes one filter apparatus of this kind, which includes a housing through which an air stream is arranged to pass, with two filter members pivotally mounted within the housing for movement between a working position, in which the air stream is forced to pass through the filter members, and a retracted position in which the air stream passes freely through the housing without passing through the filter members.

This known apparatus has a drawback, having regard to the fact that, when its mode is changed from the working position to the retracted position, contaminants which are carried by the filter members may be drawn into the cabin of the vehicle by the air stream. This disadvantage is also to be found in the filter apparatus described in the specification of German patent application No. 3 737 010.

DISCUSSION OF THE INVENTION

A main object of the invention is to provide a filter apparatus of the kind generally described above, which does not have this drawback.

According to the invention, apparatus for filtering an air stream, comprising a housing adapted for the air stream to pass through it, and at least one filter member pivotally mounted within the said housing for movement between a working position and a retracted position, is characterised in that the filter member includes a first end which is pivotally mounted about a first axis which extends at right angles to the direction in which the air stream flows within the housing, and a second end on which a flap type valve member is mounted for free displacement about a second axis that is parallel to the first axis, in such a way that in the working position the filter member extends in a direction which is inclined with respect to the direction in which the air stream flows, the valve member being inclined in a direction which is substantially parallel to the said direction of flow, and in the retracted position each of the filter members and valve members extends in a direction which is substantially parallel to the direction in which the air stream flows.

With this arrangement, in the working position the air stream passes through the filter member, while in the retracted position, the air stream passes freely through the housing without being filtered, the filter member being then protected by the valve member. The air stream which thus passes through the housing without being filtered is under no danger of being contaminated by dust or other contaminants which may be carried on the filter member.

In an apparatus according to the invention in one form, the housing has a first wall and a second wall, facing each other, and there is a single said filter member, the first axis of which is close to the said first wall, so that in the working position, the second end of the filter member is close to the said second wall, the valve member then being engaged on the said second wall, and in the retracted position the second end of the filter member is close to the said first wall, the filter member being engaged against the first wall, and the valve member being engaged against the filter member.

According to a preferred feature of the invention, the apparatus is characterised in that it has two said filter members, which are arranged symmetrically on either side of a central axis that is parallel to the direction in which the fluid flows within the housing, and in that means are provided for causing the two filter members to move in synchronised pivoting movement in such a way that, in the working position, their said second ends are brought together and the valve members are in contact with each other, and in the retracted position their second ends are spaced apart, with the two filter members then extending in directions which are generally parallel to each other, and with the valve members also extending in directions generally parallel to each other.

With the apparatus in this form, in the working position the two filter members have a V-shaped configuration, and the air stream is able to pass through the two filter members through either the inside or the outside of the V, while in the retracted position the filter members are protected by the two valve members, so that the air stream that passes through the housing without being filtered runs no risk of being contaminated by dusts or other contaminants carried by the filter members.

Preferably, each filter member has an inner main face and an outer main face, each inner main face being opposed and substantially parallel to the corresponding outer main face, so that in the working position, the air stream can enter the filter members through their inner main faces and leave through their outer main faces or vice versa, and in the retracted position each of the inner main faces lies facing a wall of the housing, with the outer main faces being in facing relationship with each other and protected by the respective valve members.

As a result, in the working position the inner main faces, and also the outer main faces, define between them an angle which corresponds to the angle defined by the V shape formed by the outer members. In the retracted position, the inner main faces and the outer main faces are substantially parallel to each other.

Preferably, each outer main face is extended on the same side of the filter member as the second end of the latter, by an end face which is joined to the said outer main face of the corresponding filter member through an obtuse angle defining a sharp edge coinciding with the corresponding said second axis, so that the valve member is able to be displaced freely about its said second axis between two positions in which it comes into engagement against, respectively, the outer main face and the end face of the associated filter member.

In consequence, in the working position, each of the valve members comes into engagement against the outer end face of the corresponding filter member, while in the retracted position each of the valve members comes into engagement against the outer main face of the corresponding filter member, with the valve members also being in overlying contact with each other.

Preferably, in the working position, the end faces of the two filter members are parallel and close to each other, while in the retracted position the outer main faces are parallel to each other and spaced apart.

In a further preferred form of the invention, each of the said walls of the housing includes a recessed portion defining a recess for receiving the corresponding filter member in the retracted position.

According to a further feature of the invention, each valve member has a main part for covering the outer main face of the associated filter member in the retracted position, and an end part for overlying the end face of the corresponding filter member in the working position, the main part and the end part of each valve member extending on either side of its pivot axis.

Preferably, the end part of each valve member extends beyond the second end of the corresponding filter member, and includes a terminal profiled element which has two opposed abutment faces, namely an inner abutment face for cooperating with the wall of the housing in the retracted position, and an outer abutment face for cooperating with the equivalent face of the other valve member when in the working position.

Preferred embodiments of the invention will now be described, by way of example only and with reference to the accompanying drawings.

DESCRIPTION OF PREFERRED EMBODIMENTS OF THE INVENTION

Figure 1:
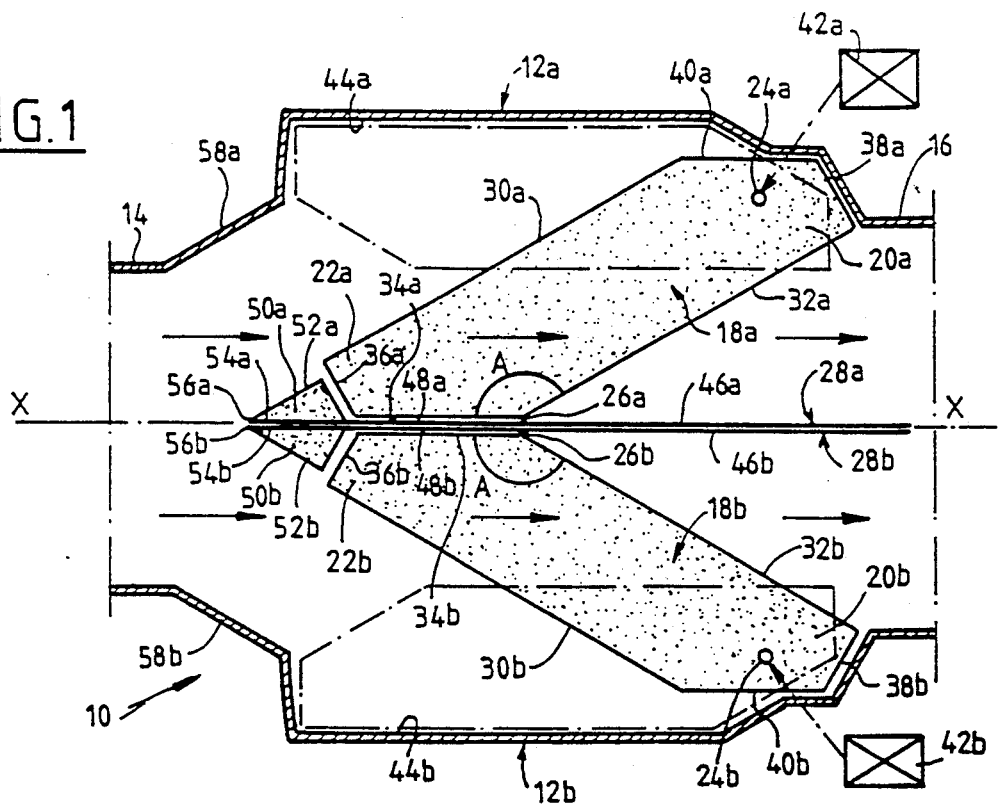
FIG. 1 is a view in cross section of a filter apparatus in accordance with the invention, comprising two filter members which are shown in the working position.

The apparatus shown in FIG. 1 comprises a housing 10 having two opposed walls 12a and 12b that are generally symmetrical about a central axis XX extending within the housing. In this example, this axis XX corresponds to the direction in which the air stream flows in the housing, which has an inlet section 14 and an outlet section 16. In this example, the air stream is able to pass through the housing from the inlet section 14 to the outlet section 16 as indicated by the arrows. However, as will be understood, the apparatus may also operate with the air stream flowing in the opposite direction.

The apparatus includes two filter members 18a and 18b, each of which has a generally elongated shape with a first end 20a, 20b respectively and a second end 22a and 22b respectively. Each of the first ends 20a, 20b is pivotally mounted about a first axis 20a, 20b respectively, extending at right angles to the central axis XX and spaced from the latter. A flap type valve member 28a is pivotally mounted on an axis 26a, parallel to the axis 24a, on the second end 22a of the filter member 18a. Similarly, a second flap type valve member 22b is pivotally mounted on a pivot axis 26b parallel to the axis 24b on the second end 22b of the filter member 18b.

Each filter member has an inner main face 30a, 30b respectively, and an outer main face 32a, 32b respectively. In each filter member, these inner and outer main faces are opposed to each other and substantially parallel. Each of the main outer faces 32a and 32b is extended, on the side of the second end of the corresponding filter member, in an end face 34a, 34b respectively. Each end face 34a or 34b is joined to the corresponding outer main face by an obtuse angle A, defining a sharp edge which coincides with the second axis 26a, 26b respectively. In this way, the valve member 28a or 28b is able to pivot freely about its axis between two extreme positions, through an angle of displacement which is substantially the supplementary angle of the angle A.

The end faces 34a, 34b are joined to the respective inner faces 30a, 30b through an anterior face 36a, 36b respectively, which is generally perpendicular to the corresponding inner face 30a, 30b. On the side corresponding to the first end 20a or 20b, the outer face 32a, 32b is joined at a right angle to a posterior face 38a, 38b respectively. Each posterior face 38a, 38b is joined to the corresponding inner face 30a or 30b through an inclined face 40a, 40b respectively.

Figure 2:
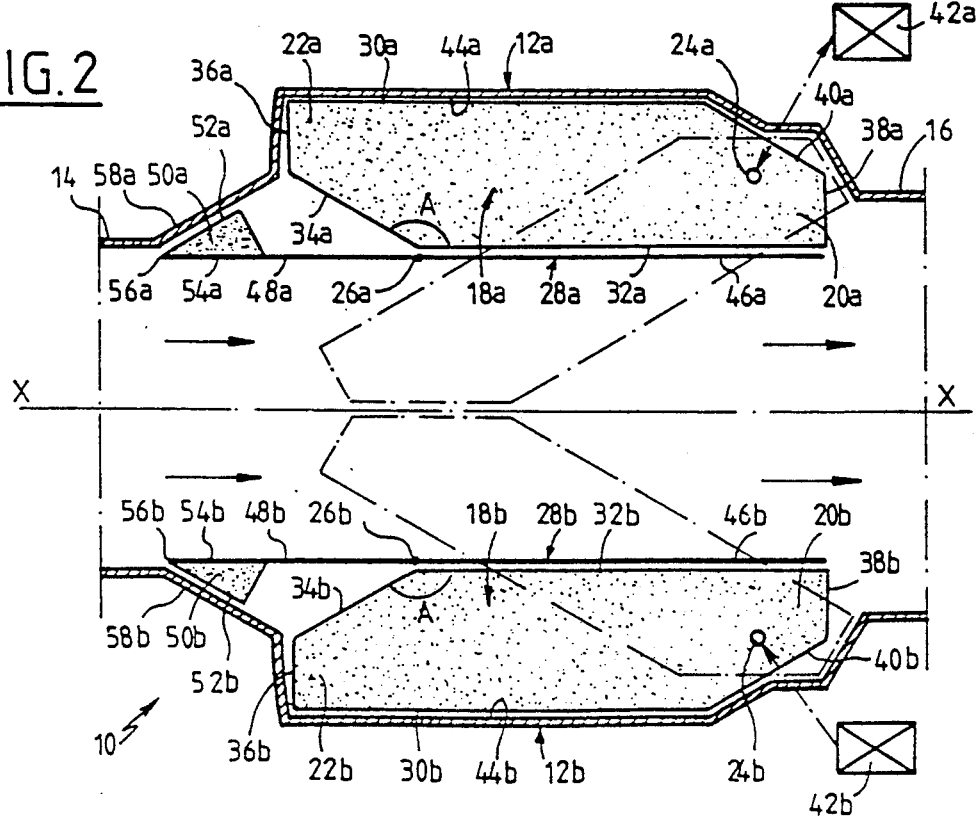
FIG. 2 is a view in cross section similar to that of FIG. 1, in which the two filter members are in a retracted position.

Control means 42a, 42b, shown diagrammatically in FIG. 1, are provided for moving the two filter members 18a and 18b in synchronised pivoting movement between a working position, shown in FIG. 1, and a retracted position seen in FIG. 2. Each of the walls 12a and 12b of the housing includes a recessed portion 44a, 44b respectively. These recessed portions define an enclosure or recess for the corresponding filter member 18a, 18b when the latter is in the retracted position seen in FIG. 2.

Each valve member 18a, 18b comprises a main part 46a, 46b respectively, for overlying the outer main face 32a, 32b of the associated filter member when in the retracted position. Each valve member also has an end part 48a, 48b respectively, which covers the end face 34a, 34b of the associated filter member in the working position, with the main part and the end part of each valve member extending on either side of the corresponding pivot axis 26a, 26b.

The end part 48a or 48b extends beyond the second end of the filter member, and includes a terminal profiled element 50a, 50b respectively. Each of these profiled elements has two opposed abutment faces, namely an inner abutment face 52a, 52b respectively, and an outer abutment face 54a and 54b respectively. In each valve member, the inner and outer abutment faces are joined together through an acute angle defining a sharp edge 56a, 56b respectively. The abutment face 52a, 52b is arranged to cooperate with a portion 58a, 58b of the wall of the housing in the retracted position (FIG. 2). The face 54a, 54b lies in an extension of the plane of the valve member, and the two faces 54a and 54b are arranged to come into engagement against each other in the working position, as can be seen in FIG. 1.

In the working position, the second ends 22a and 22b are contact with each other. The two filter members then define together a general shape in the form of a V, the angle of which corresponds with that defined between the walls 30a and 30b and between the walls 32a and 32b. In this position, the two profiled elements 50a and 50b are in contact with each other, and cooperate with each other to define a pointed head that extends the two filter members and facilitates the flow of the air stream.

In the working position seen in FIG. 1, the second ends 22a and 22b of the filter members are brought together so that the valve member 28a is in contact against the valve member 22b. The air stream that penetrates into the housing then flows through the two filter members 18a and 18b as indicated by the arrows, and leaves the housing via the outlet section 16.

In the retracted position shown in FIG. 2, the two filter members 18a and 18b are received in the recesses defined respectively by the recessed portions 44a and 44b. In this position, the outer faces 30a and 30b and the inner faces 32a and 32b are all parallel with each other. The valve members 28a and 28b pivot on themselves by cooperation of the abutment faces 52a and 52b respectively with the wall portions 58a and 58b, in such a way that they are brought into generally parallel positions in which they completely overlie the filter members. In consequence, in this position, the air stream is able to flow freely through the housing, without there being any possibility of collecting contaminants which are retained by the filter members. In this connection, the filter members are fully protected by the valve members 18a and 18b.

Figure 3:
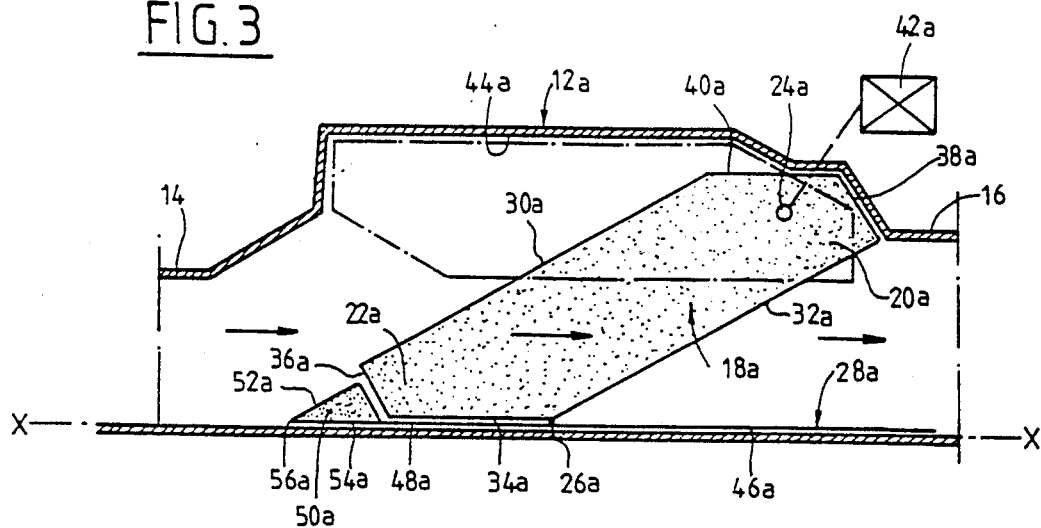
FIG. 3 is a view in cross section of a filter apparatus in accordance with the invention, comprising a single filter member which is shown in its working position.
Figure 4:
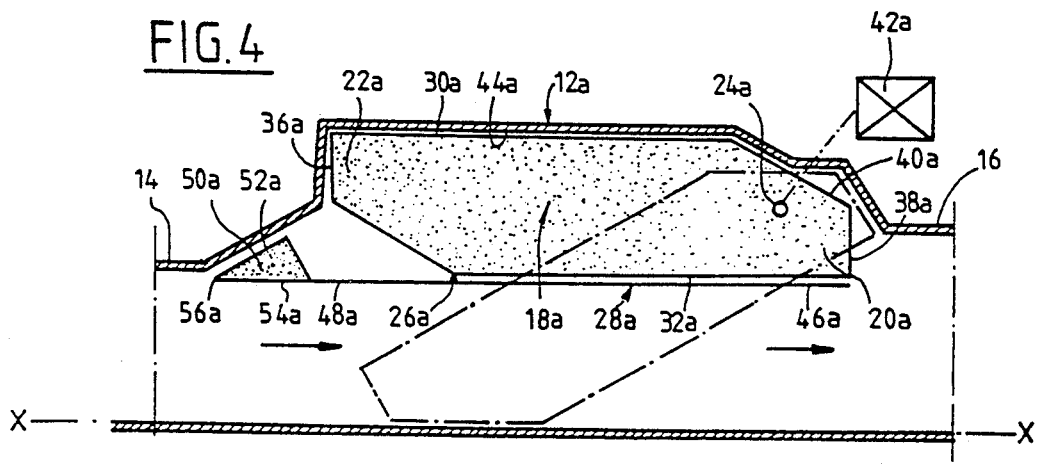
FIG. 4 is a view in cross section similar to that of FIG. 3, in which the filter member is in a retracted position.

Reference is now made to FIGS. 3 and 4, showing another embodiment in which the apparatus has a single valve member 28a, similar to that seen in FIGS. 1 and 2. The housing in this version has, opposite to the wall 12a, a wall 60 which extends substantially parallel to the direction in which the air stream flows, that is to say substantially parallel to the axis XX already mentioned with respect to FIGS. 1 and 2. In the working position (FIG. 3), the filter member 18a extends in a direction which is inclined with respect to the axis XX, while the valve member 28a extends in a direction that is substantially parallel to the axis XX and is applied against the wall 60.

In the retracted position shown in FIG. 4, the filter member 18a extends in a direction substantially parallel to the axis XX, as does the valve member 28a. The filter member 18a is then applied against the wall 12a, while the valve member 28a is applied against the filter member 18a, which is then protected by the valve member. Accordingly, the operation of the apparatus shown in FIGS. 3 and 4 is substantially the same as that shown in FIGS. 1 and 2.

The apparatus according to the invention is useful in particular in connection with heating and/or air conditioning equipment for motor vehicles.

What is claimed is:

1. Apparatus for filtering an air stream, comprising a housing defining a direction of flow for a said air stream to pass through the housing, at least one filter member within the housing, first pivot means defining a first pivot axis extending at right angles to the said direction of flow, the first pivot means mounting each filter member for pivoting movement within the housing between a working position and a retracted position, each filter member having a first end and a second end, with the said first end being mounted on the said first pivot means, the apparatus further comprising at least one flap type valve member, second pivot means defining a second pivot axis parallel to the first pivot axis and mounting each said valve member for free pivoting movement, whereby in the working position each filter member extends in a direction which is inclined with respect to the said direction of air flow, with each flap valve extending in a direction which is substantially parallel to the said flow direction, and in the retracted position, each filter member and valve member extends in a direction substantially parallel to the said flow direction.

2. Apparatus according to claim 1, wherein the housing has a first wall and a second wall facing each other, the apparatus having a single said filter member, the first pivot means being located so that the said first pivot axis is close to the first wall of the housing, whereby in the working position, the said second end of the filter member is close to the said second wall of the housing, with the valve member being engaged on the second wall, and in the retracted position the said second end of the filter member is close to the said first wall, with the filter member lying against the said first wall and the valve member overlying the filter member.

3. Apparatus according to claim 1, having two said filter members, two said first pivot means, two said second pivot means and two said valve members, the housing defining a central axis parallel to the said flow direction and the two filter members being disposed symmetrically about the said central axis, the apparatus further including actuating means for causing the filter members to be displaced between the said working and retracted positions in synchronised pivoting movement, whereby in the working position the said second ends of the filter members are brought together and the valve members are in contact with each other, while in the retracted position, the said second ends are spaced apart from each other with the two filter members then extending in directions which are generally parallel to each other, and with the valve members also extending in directions which are generally parallel to each other.

4. Apparatus according to claim 3, wherein each filter member has an inner main face and an outer main face opposed and substantially parallel to the inner main face, whereby in the working position the air stream can enter each filter member through one of its said main faces and leave it through the other, the housing having two opposed walls whereby, in the retracted position, each inner main face lies facing a respective said wall of the housing, with the outer main faces lying facing towards each other and being protected by their respective valve members.

5. Apparatus according to claim 4, wherein each of the said walls of the housing includes a recessed portion defining a recess for accommodating the corresponding filter member in the retracted position.

6. Apparatus according to claim 4, wherein each filter member further has an end face extending the outer main face of the filter member on the side of the second end of the latter and being joined to the outer main face through an obtuse angle defining a sharp edge coincident with the corresponding said second pivot axis, whereby the corresponding flap valve is freely movable about the said second pivot axis between a first position in which it lies against the outer main face of the filter member and a second position in which it lies against the said end face of the latter.

7. Apparatus according to claim 6, wherein the said end face and outer main face of each filter member are so oriented that in the working position the end faces of the two filter members lie parallel and close to each other, while in the retracted position the outer main faces of the two filter members are parallel and spaced apart from each other.

8. Apparatus according to claim 6, wherein each said valve member has a main part for overlying the outer main face of the corresponding filter member in the retracted position, and an end part for overlying the end face of the filter member in the working position, with the said main part and end part extending on either side of the said second pivot axis about which the valve member is pivotally movable.

9. Apparatus according to claim 8, wherein, in each filter member, the said end part extends beyond the second end of the filter member, the filter member further including a terminal profiled element of the said second end thereof, the terminal profiled element defining an inner abutment face for cooperation with the said wall of the housing in the retracted position, and an outer abutment face opposed to the inner abutment face for cooperating with the equivalent face of the other valve member in the working position.

10. Apparatus according to claim 9, wherein the said terminal profiled elements are so configured that in the working position, they cooperate with each other to define a pointed head extending the two filter members.

* * * * *